United States Patent [19]

Ishida et al.

[11] Patent Number: 5,063,119

[45] Date of Patent: Nov. 5, 1991

[54] MAGNETIC RECORDING MEDIUM COMPRISING A FLUORINE CONTAINING OLIGOMER SURFACTANT IN OR ON THE MAGNETIC LAYER

[75] Inventors: Toshio Ishida; Akira Ushimaru; Yasuo Nishikawa, all of Kanagawa, Japan

[73] Assignee: Fuji Photo Film Co., Ltd., Kanagawa, Japan

[21] Appl. No.: 489,987

[22] Filed: Mar. 7, 1990

[30] Foreign Application Priority Data

Mar. 7, 1989 [JP] Japan .................................. 1-54255

[51] Int. Cl.$^5$ ............................................. G11B 23/00
[52] U.S. Cl. .................................... 428/694; 428/695; 428/900; 252/62.54; 252/58
[58] Field of Search ............... 428/900, 694, 421, 695; 526/245

[56] References Cited

U.S. PATENT DOCUMENTS 4,681,925 7/1987 Strepparola et al. ................ 526/246
4,851,472 7/1989 Famili et al. .......................... 525/60

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A magnetic recording medium comprising a nonmagnetic support having provided thereon a magnetic layer comprising ferromagnetic particles dispersed in a binder, said magnetic layer having therein or on its surface a fluorine-containing oligomer surfactant which has a side chain having a poly(alkylene oxide) structure, a side chain terminated with a perfluoroalkyl group, and a side chain derived from an ester of acrylic or methacrylic acid with an aliphatic alcohol.

7 Claims, No Drawings

MAGNETIC RECORDING MEDIUM COMPRISING A FLUORINE CONTAINING OLIGOMER SURFACTANT IN OR ON THE MAGNETIC LAYER

FIELD OF THE INVENTION

The present invention relates to a magnetic recording medium comprising a nonmagnetic support and provided thereon a magnetic layer consisting of a dispersion of ferromagnetic particles in a binder. More particularly, it relates to a magnetic recording medium which shows excellent running properties and durability over a wide temperature and humidity range.

BACKGROUND OF THE INVENTION

In the field of magnetic recording media, there is a strong demand for high-density recording. Surface smoothness of the magnetic layers is one of the known measures in coping with such demand.

However, the smoothness of the magnetic layer surface causes the coefficient of friction between the running magnetic layer of the magnetic recording medium and the recording or reproducing device's parts in contact with the magnetic layer to be so heightened that the magnetic layer is apt to suffer damage or peel off in a relatively short period of use.

For overcoming the above problem, lubricating agents such as fatty acids, fatty acid esters, hydrocarbons, and silicone compounds have so far been used.

With the recent spread and popularization of flexible disk drives for home use such as those for VTR's, personal computers, or word processors, the conditions under which magnetic recording media are used have become varied in wide ranges including low-temperature conditions and high-temperature and high-humidity conditions. Therefore, the running durability of the magnetic recording media should be stable under various expected conditions. The above-mentioned known lubricating agents, however, are insufficient for such purpose.

As another measure to improve running durability, incorporation of abrasive agents (hard particles) in magnetic layers has been proposed and is being practiced. However, this technique is disadvantageous in that in order to minimize the improvement in running durability of magnetic layers, an abrasive agent should be incorporated in a considerably large amount. In other words, it is difficult after all to obtain good running durability without impairing electromagnetic characteristics and head abrasion resistance.

Use of organofluorine compounds as lubricating agents is conventionally known as disclosed in, for example, JP-A-58-164023, JP-A-59-33624, JP-A-57-12417, JP-A-57-37730, JP-A-59-152525, and JP-A-62-1116. (The term "JP-A" as used herein means an "unexamined published Japanese patent application".)

Although magnetic head staining can be diminished by these organofluorine compounds, the dispersing effect of such lubricating agents is so insufficient that the resulting magnetic layers cannot have satisfactory smoothness. It has further been proposed in JP-A-59-167841, for example, to incorporate an organofluorine compound, as a lubricating agent, having in its molecule a perfluoroalkyl group and a poly(alkylene oxide) group, into a magnetic coating composition containing a dialkyl sulfosuccinate as a dispersing agent, thereby to improve the durability and heat resistance of magnetic layers without impairing the ability to disperse magnetic powders.

However, since the above fluorine compound shows good compatibility with binders, it is difficult to balance the amount of the fluorine compound to be incorporated with the amount thereof which will migrate to the magnetic layer surface. Thus, the above-proposed fluorine compound has been unable to produce a stable effect when incorporated in a small amount.

SUMMARY OF THE INVENTION

The present inventors have conducted intensive studies of lubricating agents and binders which might eliminate the above problems associated with recording media having magnetic powder coatings. As a result, they have found that further improved durability and adaptability to environmental conditions can be obtained by incorporating into magnetic layers a fluorine-containing oligomer surfactant having a poly(alkylene oxide) side chain, a side chain terminated with a perfluoroalkyl group, and a side chain derived from an ester of acrylic or methacrylic acid with an aliphatic alcohol. This invention has been completed based on this finding.

It is, therefore, an object of the present invention to provide a magnetic recording medium which shows excellent running properties and durability over a wide temperature and humidity range.

According to the present invention, there is provided a magnetic recording medium comprising a nonmagnetic support having provided thereon a magnetic layer comprising ferromagnetic particles dispersed in a binder, the magnetic layer having therein or on its surface a fluorine-containing oligomer surfactant which has a side chain having a poly(alkylene oxide) structure, a side chain terminated with a perfluoroalkyl group, and a side chain derived from an ester of acrylic or methacrylic acid with an aliphatic alcohol.

DETAILED DESCRIPTION OF THE INVENTION

Preferred embodiments of this invention include:

(1) a magnetic recording medium as described above in which the magnetic layer has therein or on its surface the fluorine-containing oligomer surfactant as described above and an ester compound, and said binder contains a polymer in which a polar group has been incorporated in an amount of $1 \times 10^{-6}$ to $1 \times 10^{-4}$ equivalent per g of the polymer;

(2) a magnetic recording medium as described above in which the fluorine-containing oligomer surfactant contains 2 to 40%, in terms of polymerization degree (numerical percentage), of copolymerized monomer units derived from an aliphatic ester of acrylic or methacrylic acid; and (3) a magnetic recording medium as described in (1) above in which the ester compound is one represented by the general formula:

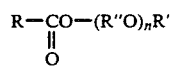

wherein R is a straight-chain or branched hydrocarbon group having 5 to 22 carbon atoms, R' is a straight-chain or branched hydrocarbon group having 1 to 8 carbon atoms, R" is a straight-chain or branched divalent hydrocarbon group having 2 to 3 carbon atoms, and n is an integer of from 0 to 11.

The fluorine-containing oligomer surfactant employed in this invention, which has a side chain having a poly(alkylene oxide) structure, a side chain terminated with a perfluoroalkyl group, and a side chain derived from an ester of acrylic or methacrylic acid with an aliphatic alcohol, is preferably represented by the following general formula (I):

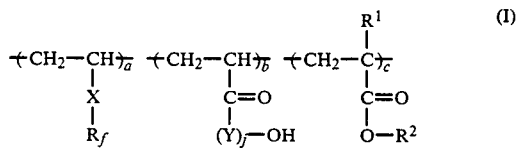

wherein $R_f$ represents a perfluoroalkyl group, X represents

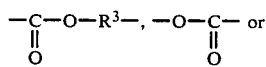

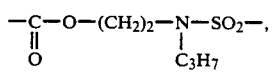

(in which $R^3$ represents a divalent hydrocarbon group having 1 to 3 carbon atoms), Y represents at least one alkenylene oxide group having 1 to 10 carbon atoms, j is an integer of from 5 to 120, $R^1$ represents a hydrogen atom or a methyl group, $R^2$ represents a hydrocarbon group, a is an integer of from 10 to 90, b is an integer of from 5 to 50, and c is an integer of from 5 to 70, provided that the total number of a, b and c is 100.

Specific examples of the fluorine-containing oligomer surfactant are listed in Tables 1 and 2. The side chain having a poly(alkylene oxide) structure has a hydrophilic nature or an intermediate nature between lipophilic and hydrophilic, or has both natures, and it shows moderate interactions with resins having a polar group.

The side chain terminated with a perfluoroalkyl group has water repellency as well as oil repellency.

The side chain derived from an ester of acrylic or methacrylic acid with an aliphatic alcohol has a lipophilic nature due to the long hydrocarbon residue present in the side chain.

Preferred fluorine-containing oligomer surfactants are those in which the perfluoroalkyl groups are of a straight-chain structure.

The polymerization degree of the fluorine-containing oligomer is not particularly limited, but is preferably in the range of from about 10 to 400.

In the fluorine-containing oligomer, the amount of the copolymerized monomer units derived from an aliphatic ester of acrylic or methacrylic acid is preferably 2 to 40%, more preferably 5 to 30%, in terms of polymerization degree (numerical percentage).

The amount of the copolymerized fluorine-containing monomer units is preferably 10 to 90% in terms of polymerization degree (numerical percentage). From the standpoints of the surface modification effect on magnetic layers and of dissolution of the oligomer surfactant in solvents or magnetic coating compositions, the amount thereof is preferably 15 to 70%.

The fluorine-containing oligomer as described above can be synthesized by subjecting monomers selected from those listed in Table 2 to radical or anionic polymerization in respective proportions as shown in Table 1.

TABLE 1

| | | | Examples of fluorine-containing oligomer | | | | | |
|---|---|---|---|---|---|---|---|---|
| | | Monomer unit (1) | | | | Monomer unit (2) | | Monomer unit (3) |
| | | Polymerization degree | Composition of poly(alkylene oxide) segment | | | | Polymerization degree | | Polymerization degree |
| No. | Kind | degree | l | m | n | Kind | degree | Kind | degree |
| 1 | α | 70 | — | — | 20 | $A_2$ | 30 | a | 20 |
| 2 | β | 70 | — | — | 20 | $A_2$ | 30 | a | 30 |
| 3 | γ | 60 | 11 | 30 | 11 | $A_2$ | 40 | a | 5 |
| 4 | γ | 70 | 10 | 22 | 10 | $A_1$ | 30 | a | 15 |
| 5 | γ | 70 | 12 | 12 | 12 | $A_2$ | 30 | a | 20 |
| 6 | γ | 70 | 24 | 24 | 24 | $A_3$ | 30 | a | 40 |
| 7 | γ | 80 | 20 | 10 | 20 | $A_2$ | 20 | a | 2 |
| 8 | δ | 80 | 10 | 26 | 10 | $A_2$ | 20 | a | 10 |
| 9 | α | 60 | — | — | 20 | $B_2$ | 40 | b | 7 |
| 10 | β | 75 | — | — | 20 | $C_2$ | 25 | b | 12 |
| 11 | γ | 70 | 20 | 20 | 20 | $A_2$ | 30 | b | 26 |
| 12 | δ | 70 | 10 | 30 | 11 | $B_1$ | 30 | b | 32 |

(Note)
α, β, γ, δ, A, B, C, l, m, n, a, b: refer to TABLE 2.

TABLE 2

| Kind | Structural formula | Remarks | Monomer |
|---|---|---|---|
| A | $\begin{array}{c} +CH_2-CH+ \\ | \\ C-O-CH_2CH_2-N-SO_2-R_f \\ \| \qquad\qquad \| \\ O \qquad\qquad C_3H_7 \end{array}$ | $A_1: R_f = C_5F_{11}$<br>$A_2: R_f = C_8F_{17}$<br>$A_3: R_f = C_{13}F_{27}$ | $\begin{array}{c} CH_2=CH \\ | \\ C-O-CH_2CH_2-N-SO_2-R_f \\ \| \qquad\qquad \| \\ O \qquad\qquad C_3H_7 \end{array}$ |
| B | $\begin{array}{c} +CH_2-CH+ \\ | \\ C-O-CH_2CH_2-R_f \\ \| \\ O \end{array}$ | $B_1: R_f = C_{11}F_{23}$<br>$B_2: R_f = C_{18}F_{37}$<br>$B_3: R_f = C_{22}F_{45}$ | $\begin{array}{c} CH_2=CH \\ | \\ C-O-CH_2CH_2-R_f \\ \| \\ O \end{array}$ |

TABLE 2-continued

| Kind | Structural formula | Remarks | Monomer |
|---|---|---|---|
| C | $-(CH_2-CH)-$<br>$\quad\mid$<br>$\quad O-C-R_f$<br>$\qquad\parallel$<br>$\qquad O$ | $C_1: R_f = C_5F_{11}$<br>$C_2: R_f = C_8F_{17}$<br>$C_3: R_f = C_{13}F_{27}$ | $CH_2=CH$<br>$\quad\mid$<br>$\quad O-C-R_f$<br>$\qquad\parallel$<br>$\qquad O$ |
| α | $-(CH_2-CH)-$<br>$\quad\mid$<br>$\quad C-(O-C_2H_4)_n OH$<br>$\parallel$<br>$O$ | n = see Table 1 | $CH_2=CH$<br>$\quad\mid$<br>$\quad C-(O-C_2H_4)_n OH$<br>$\parallel$<br>$O$ |
| β | $-(CH_2-CH)-$<br>$\quad\mid$<br>$\quad C-(O-C_3H_6)_n OH$<br>$\parallel$<br>$O$ | n = see Table 1 | $CH_2=CH$<br>$\quad\mid$<br>$\quad C-(O-C_3H_6)_n OH$<br>$\parallel$<br>$O$ |
| γ | $-(CH_2-CH)-$<br>$\quad\mid$<br>$\quad C-(OC_2H_4)_l(OC_3H_6)_m(OC_2H_4)_n OH$<br>$\parallel$<br>$O$ | l = see Table 1<br>m = see Table 1<br>n = see Table 1 | $CH_2=CH$<br>$\quad\mid$<br>$\quad C-(OC_2H_4)_l(OC_3H_6)_m(OC_2H_4)_n OH$<br>$\parallel$<br>$O$ |
| δ | $-(CH_2-CH)-$<br>$\quad\mid$<br>$\quad C-(OC_2H_4)_l(OC_3H_6)_m(OC_2H_4)_n OCH_3$<br>$\parallel$<br>$O$ | l = see Table 1<br>m = see Table 1<br>n = see Table 1 | $CH_2=CH$<br>$\quad\mid$<br>$\quad C-(OC_2H_4)_l(OC_3H_6)_m(OC_2H_4)_n OCH_3$<br>$\parallel$<br>$O$ |
| a | $\qquad CH_3$<br>$\qquad\mid$<br>$-(CH_2-C)-$<br>$\quad\mid$<br>$\quad C-O-R$<br>$\parallel$<br>$O$ | $R = C_{18}H_{37}$ | $\qquad CH_3$<br>$\qquad\mid$<br>$CH_2=CH$<br>$\quad\mid$<br>$\quad C-O-R$<br>$\parallel$<br>$O$ |
| b | $-(CH_2-CH)-$<br>$\quad\mid$<br>$\quad C-OR$<br>$\parallel$<br>$O$ | $R = C_{18}H_{37}$ | $CH_2=CH$<br>$\quad\mid$<br>$\quad C-OR$<br>$\parallel$<br>$O$ |

In the case where the fluorine-containing oligomer surfactant is incorporated internally in the magnetic layer of an ordinally magnetic recording medium, the amount of the surfactant incorporated is preferably 0.01 to 8% by weight based on the amount of the ferromagnetic particles. Where the surface of the magnetic layer of a magnetic recording medium is top-coated with the fluorine-containing oligomer surfactant, the amount of the surfactant applied is preferably 2 to 50 mg/m².

If the amount of the fluorine-containing oligomer surfactant used exceeds the upper limit, the amount of the surfactant present on the magnetic layer surface becomes too large, and this not only may cause trouble such as sticking, but impairs the durability of the magnetic layer if the surfactant has been incorporated internally, because the surfactant has the effect of plasticizing the binder in the magnetic layer.

If the amount of the surfactant used is less than the lower limit, this of course results in a too small amount of the surfactant present on the magnetic layer surface, so that no effect is brought about.

In the present invention, other lubricating agent(s) may be incorporated in combination with the fluorine-containing oligomer surfactant.

It is preferable in this invention that an ester compound represented by the following general formula (II) be used in addition to the above-described fluorine-containing oligomer surfactant.

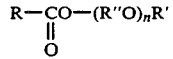  (II)

In the above general formula (II), R is a straight-chain or branched hydrocarbon group having 5 to 22 carbon atoms. Examples of R include a pentyl group, a methylbutyl group, a hexyl group, an octyl group, and a nonyl group.

R' is a straight-chain or branched hydrocarbon group having 1 to 8 carbon atoms. Examples of R' include a methyl group, an ethyl group, a propyl group, a butyl group, a pentyl group, a hexyl group, a heptyl group, and an octyl group.

R" is a straight-chain or branched divalent hydrocarbon group having 2 to 3 carbon atoms. Examples of R" include an isopropylene group, an ethylene group, and an n-propylene group.

Symbol n is an integer of from 0 to 11.

Specific examples of the ester compound represented by the general formula (II) include monoisopropylethylene glycol behenate, n-butoxyethyl stearate, n-butoxypropyl stearate, n-pentaoxyethyl stearate, n-butyl triglycol stearate, i-butyl triglycol stearate, n-hexyl tetraglycol behenate, and n-octaoxybutyl laurate.

The ester compound described above may preferably be used in an amount of 0.1 to 3 parts by weight per 100 parts by weight of the ferromagnetic particles. If the amount of the ester compound used is less than 0.1 part by weight, a sufficient lubricating effect cannot be produced. If the amount thereof exceeds 3 parts by weight, the ester compound causes problems such as bleeding.

The binder contained in the magnetic layer may comprise a polymer having a skeletal structure which may be selected from ordinarily employed ones. Examples of such skeletal structures include a vinyl chloride-vinyl acetate copolymer, a copolymer of vinyl chloride and vinyl acetate with vinyl alcohol, maleic acid, and/or acrylic acid, a vinyl chloride-vinylidene chloride copolymer, a vinyl chloride-acrylonitrile copolymer, an ethylene-vinyl acetate copolymer, cellulose derivatives such as a nitrocellulose resin, acrylic resins, polyvinyl acetal resins, polyvinyl butyral resins, epoxy resins, phenoxy resins, polyurethane resins, and polycarbonate polyurethane resins.

Examples of polar groups which the skeletal structure described above may contain include an epoxy group, COOR', OH, $NH_2$, $SO_3R^4$, $OSO_3R^4$, $PO_3(R^4)_2$, and $OPO_3(R^4)_2$, wherein $R^4$ represents a hydrogen atom, an alkali metal, ammonium, N-hydrocarbon-substituted ammonium, or a hydrocarbon group.

Examples of polar group-containing resins which may be employed in the binder according to the invention include: a polyurethane resin having —COOR$^5$ group or —SO$_3$R$^5$ group (wherein R$^5$ represents a hydrogen atom, an alkali metal such as sodium or potassium, ammonium, or N-hydrocarbon-substituted ammonium); a vinyl chloride resin having an epoxy group, OH, $NH_2$, —SO$_3$R$^4$ group, —COOR$^4$ group, —O-SO$_3$R$^4$ group, or

group (wherein $R^4$ is as defined above, and $R^6$ represents a hydrogen atom, an alkali metal, ammonium, N-hydrocarbon-substituted ammonium, or a hydrocarbon group); and a polyester resin having —SO$_3$R$^5$ group (wherein R$^5$ is as defined above).

These resins are described in, for example, JP-A-59-8127, JP-A-59-92422, JP-A-57-92423, JP-A-59-8127, and JP-A-59-40320.

Specific examples of such polar group-containing resins include: —COOH group-containing urethane resin "TIM-3005" manufactured by Sanyo Chemical Industries, Ltd., Japan; —COOH group-containing vinyl chloride-vinyl acetate copolymer "400X110A" manufactured by Nippon Zeon Co., Ltd., Japan; —SO$_3$Na group-containing polyester "Vylon 530" manufactured by Toyobo Co., Ltd., Japan; and —SO$_3$Na group-containing vinyl chloride copolymer "MR-110" manufactured by Nippon Zeon Co., Ltd. The polar group contents in these resins are in the range of from $1 \times 10^{-6}$ eq/g to $1 \times 10^{-3}$ eq/g.

If the polar group content is higher than $1 \times 10^{-3}$ eq/g, the resin shows poor solubility in organic solvents and the resulting vehicle for magnetic coating compositions disadvantageously has poor dispersing ability. On the other hand, if the polar group content is lower than $1 \times 10^{-6}$ eq/g, the interaction between the resin and the fluorine-containing oligomer surfactant as described hereinbefore becomes so weak that effective lubrication does not occur on the surface of the resulting magnetic layer.

Further, the polar group-containing resin shows moderate interaction with the ester compound as described hereinbefore if the polar group content in the resin is in the above-specified range. The molecular weight of the polar group-containing resin is preferably from 10,000 to 200,000.

The above-described polar group-containing resins may be used alone or in combination of two or more thereof, and may also be used along with a thermoplastic, thermosetting, or reactive-type resin which has conventionally been generally used as a binder for use in magnetic recording media. In this case, the polar group-containing resin should comprise 5% by weight or more, preferably 15 to 30% by weight, of the binder. The amount of the binder contained in the magnetic layer is generally 10 to 100 parts by weight, preferably 20 to 40 parts by weight, per 100 parts by weight of the ferromagnetic particles.

As described hereinbefore, the fluorine-containing oligomer surfactant employed in this invention has a side chain having a poly(alkylene oxide) structure, a side chain terminated with a perfluoroalkyl group, and a side chain derived from an ester of acrylic or methacrylic acid with an aliphatic alcohol. The side chain having a poly(alkylene oxide) structure can have both of hydrophilic nature and lipophilic nature and, hence, is easily and moderately adsorbed onto a polar part of the binder in the magnetic layer. Further, when the oligomer surfactant is transferred to a magnetic head, the side chain having a poly(alkylene oxide) structure is also easily adsorbed onto the magnetic head because of the hydrophilicity of the magnetic head. The side chain terminated with a perfluoroalkyl group has both water repellency and oil repellency and, hence, it can prevent the attachment of foreign particles such as hydrophilic inorganic particles and lipophilic organic particles. That is, due to its water repellency and oil repellency, this side chain has the effect of keeping foreign particles away from the magnetic layer. The side chain derived from an ester of acrylic or methacrylic acid with an aliphatic alcohol has a lipophilic nature and, hence, is easily adsorbed onto a lipophilic part of the binder in the magnetic layer. Thus, the fluorine-containing oligomer surfactant employed in this invention is easily adsorbed onto the magnetic layer surface as well as the magnetic head surface and is free from the attachment of foreign particles due to the presence of the perfluoroalkyl moiety that has both water repellency and oil repellency, whereby the magnetic recording medium of this invention has been highly improved in head staining, head clogging, and contact noise. The above-described effects of this invention are enhanced when the polar group-containing binder as described herein before and the ester compound as described hereinbefore are used as binder and lubricating agent, respectively. This is because the fluorine-containing oligomer surfactant can be stably present on the magnetic layer surface due to the anchoring effect which is produced by the strong interaction between the hydrophilic side chain having a poly(alkylene oxide) structure and a polar group of the binder and by the strong interaction between the ester-derived lipophilic side chain and a lipophilic part of the binder, and also because the ester compound as lubricating agent has the effect of bringing out the fluorine-containing oligomer surfactant therewith onto the magnetic layer surface since the ester compound is prone to migrate to the magnetic layer surface and shows good compatibility with the ester-derived side chain. Furthermore, when the ester compound is present on the magnetic layer surface, the fluorine-containing oligomer surfactant adsorbed on the magnetic layer surface in turn adsorbs the ester compound and, by means of its anchoring effect, prevents bleeding, etc. which may cause staining or sticking.

Therefore, if the specific fluorine-containing oligomer surfactant is used in combination with a binder the molecules of which have a polar group in a specific amount and also with the ester compound, there can be attained a subtle balance between the localization of the ester compound on the binder surface and the anchoring effect of the ester compound to the binder, whereby the magnetic recording medium of this invention can have, for a prolonged period of time, the effect of preventing attachment of foreign substances to magnetic heads. Although the fluorine-containing oligomer is solid or a liquid with an extremely high viscosity, it can be made to have a moderate viscosity by the combined use with the above-described ester compound, so that the fluorine-containing oligomer is effectively distributed over the magnetic layer surface and the oligomer and the ester compound can exert their remarkable effects.

The magnetic recording medium of the present invention has a basic structure comprising a nonmagnetic support and provided thereon a magnetic layer comprising ferromagnetic particles dispersed in a binder.

The nonmagnetic support in the magnetic recording medium according to the invention may be an ordinarily employed one. Examples of the material therefor include films of various synthetic resins such as poly(ethylene terephthalate), polypropylene, polycarbonates, poly(ethylene naphthalate), polyamides, poly(amide-imide)s, and polyimides, and metal foils such as an aluminum foil and a stainless-steel foil. The thickness of the nonmagnetic support may generally be in the range of from 3 to 100 μm, with the preferred range for magnetic tape being from 3 to 30 μm and that for magnetic disk being from 20 to 100 μm.

The nonmagnetic support may also be one which has a backing layer on the side remote from the magnetic layer.

In the magnetic recording medium of the present invention, the above-described nonmagnetic support has, provided thereon, a magnetic layer comprising ferromagnetic particles dispersed in a binder.

The ferromagnetic particles according to the invention may be ordinarily employed ones. Examples of the ferromagnetic particles include ferromagnetic metal fine particles containing iron as the major component, ferromagnetic particles based on iron oxides such as $\gamma$-$Fe_2O_3$ and $Fe_3O_4$, and ferromagnetic particles based on iron oxide and other metal(s) such as Co-modified iron oxide, barium ferrite, and strontium ferrite.

It is preferable that the ferromagnetic particles contained in the magnetic layer in the magnetic recording medium of this invention be ferromagnetic particles based on modified iron oxide that has been reduced into a fine powder or ferromagnetic metal fine particles, since such ferromagnetic particles show good distribution although their sizes are very small. In the case of ferromagnetic metal fine particles, they preferably have a specific surface area of 42 $m^2/g$ or larger, more preferably 45 $m^2/g$ or larger. In the case of ferromagnetic particles based on iron oxide and other metal(s), their specific surface area is preferably 30 $m^2/g$ or larger, more preferably 40 $m^2/g$ or larger.

The ferromagnetic particles preferably have a crystallite size (measured by X-ray diffraction) of 450 Å or less, which is the preferred range from the standpoint of electromagnetic characteristics ant in which the effects of the above-described specific fluorine-containing oligomer surfactant, having a poly(alkylene oxide) side chain, a side chain terminated with a perfluoroalkyl group, and a side chain derived from an ester of acrylic or methacrylic acid with an aliphatic alcohol, can be remarkably produced. The effects of the present invention are significant with ferromagnetic fine particles having a crystallite size of 300 Å or less, particularly 200 Å or less, which ferromagnetic particles have so far rarely provided good running durability.

As the ferromagnetic metal fine particles, there may be mentioned, for example, ferromagnetic alloy fine particles which have a metal content of 75% by weight or more and in which more than 80% by weight of the metal(s) consists of at least one kind of ferromagnetic metal or alloy (for example, Fe, Co, Ni, Fe-Co, Fe-Ni, Co-Ni, Co- Ni-Fe) and 20% by weight or less of the metal(s) may consist of other elements (for example, Al, Si, S, Sc, Ti, V, Cr, Mn, Cu, Zn, Y, Mo, Rh, Pd, Ag, Sn, Sb, Te, Ba, Ta, W, Re, Au, Hg, Pb, B, La, Ce, Pr, Nd, Bi, P). The above ferromagnetic metal(s) may be one(s) containing a slight amount of water, hydroxides, or oxides. Methods for producing such ferromagnetic metal fine particles are known, and the ferromagnetic metal fine particles, described above as an example of the ferromagnetic particles to be employed in this invention, can be prepared according to the known methods. Although ferromagnetic metal fine particles with pH values of 6–10 are widely used, those with pH values of 8 or more are now attracting attention because of their rust-resisting properties.

The shape of the ferromagnetic particles is not particularly limited, and may generally be acicular, particulate, cubical, or flat, or the shape of a grain of rice. However, preferably employed are acicular ferromagnetic particles, which have aspect ratios (width to length) of generally 1 to 3 or larger, preferably 1 to 8 or larger.

Besides the ester compound as described hereinbefore, other lubricating agents may be used according to the invention in combination with the fluorine-containing oligomer surfactant.

Examples of such lubricating agents which can be used in combination with the fluorine-containing oligomer surfactant and the ester compound include saturated or unsaturated fatty acids (e.g., myristic acid, stearic acid, oleic acid), metallic soaps, N-substituted or N-unsubstituted fatty acid amides, higher aliphatic alcohols, monoalkyl phosphates, dialkyl phosphates, trialkyl phosphates, paraffin acids, silicone oils, animal oils, vegetable oils, mineral oils, higher aliphatic amines; inorganic fine particles of graphite, silica, molybdenum disulfide, and tungsten disulfide; fine particles of resins such as polyethylene, polypropylene, poly(vinyl chloride), ethylene-vinyl chloride copolymers, and polytetrafluoroethylene; α-olefin polymers; unsaturated aliphatic hydrocarbons that are liquid at ordinary temperature, perfluoroalkyl polyethers the terminals of which have been modified or unmodified, and fluorocarbons.

The amount of the above lubricating agent incorporated, which can be combined with the fluorine-containing oligomer surfactant and the ester compound, varies depending on the use of the magnetic recording medium, but may generally be about 1/10 to 2 times of the total amount of the fluorine-containing oligomer surfactant and the ester compound.

As methods of allowing the fluorine-containing oligomer surfactant, which has a poly(alkylene oxide) side chain, a side chain terminated with a perfluoroalkyl group, and a side chain derived from an ester of acrylic or methacrylic acid with an aliphatic alcohol, to be present in the magnetic recording medium, there may be mentioned a method in which the oligomer surfactant is incorporated in the magnetic layer and a method in which the oligomer surfactant is top-coated on the magnetic layer. For practicing the latter method, there may be employed, for example, a process in which the surfactant is dissolved in an organic solvent and the resulting solution is coated or sprayed on a base plate and then dried, a process in which the surfactant is melted and the melt is applied on a base plate, a process in which the surfactant is dissolved in an organic solvent and a base plate is dipped in the resulting solution to thereby allow the surfactant to be adsorbed onto the base plate surface, or the Langmuir-Blodgett's technique.

The effects of the present invention can be obtained even if the magnetic layer has any surface roughness. In recent years, however, surface smoothness has become essential to magnetic layers for attaining high-density recording and high resolution, but the smoothness of magnetic layers results in poor running properties and durability, causing serious practical problems, and also results in the staining of recording or reproducing heads. Thus, magnetic recording media of practical value have only been able to be manufactured by conventional techniques if very smooth magnetic layer surfaces are obtained.

However, according to the present invention, its effects can be produced even when the magnetic layer has a surface roughness as small as 0.015 $\mu$m or less, such magnetic layer being very difficult to run by ordinary techniques. Particularly significant effects are obtained when the magnetic layer has a surface roughness of 0.010 $\mu$m or less.

The surface roughness values in this invention mean those as measured with a needle-touching surface roughness meter (Surfcom 800Å type manufactured by Tokyo Seimitsu K.K., Japan). The above measurements were performed with the cut-off value of 0.08 mm.

Inorganic particles which can be contained in the magnetic layer are not particularly limited if they have a Mohs' hardness of 5 or more. Examples of the inorganic particles having a Mohs' hardness of 5 or more include $Al_2O_3$ (Mohs' hardness 9), TiO (Mohs' hardness 6), $TiO_2$ (Mohs' hardness 6.5), $SiO_2$ (Mohs' hardness 7), $SnO_2$ (Mohs' hardness 0 6.5), $Cr_2O_3$ (Mohs' hardness 9), and $\alpha$-$Fe_2O_3$ (Mohs' hardness 5.5). These may be used alone or in combination.

Particularly preferred are inorganic particles having a Mohs' hardness of 8 or more. If inorganic particles with a Mohs' hardness below 5 are used to form a magnetic layer, not only the inorganic particles are prone to fall from the magnetic layer, but also clogging of heads is apt to occur and running durability becomes poor, because the resulting magnetic layer has almost no head-abrading effect.

The amount of the inorganic particles contained in the magnetic layer is generally in the range of from 0.1 to 20 parts by weight, preferably from 1 to 10 parts by weight, per 100 parts by weight of the ferromagnetic particles.

It is preferable that in addition to the above-described inorganic particles, carbon black (particularly, carbon black having an average particle diameter of 10 to 300 nm (nm = $10^{-9}$ m)) or the like be incorporated in the magnetic layer.

An exemplary method of preparing the magnetic recording medium of this invention will be described below.

First, a magnetic coating composition is prepared by kneading ferromagnetic particles, a polar group-containing resin, a fluorine-containing oligomer surfactant which has a side chain having a poly(alkylene oxide) structure, a side chain terminated with a perfluoroalkyl group, and a side chain derived from an ester of acrylic or methacrylic acid with an aliphatic alcohol, and an ester compound, and if necessary other fillers (e.g., silica, carbon, alumina, etc.) and additives (e.g., fatty acids such as stearic acid, fatty acid esters such as butyl stearate, etc.), together with a solvent. The solvent can be one which is ordinarily employed in preparing conventional magnetic coating compositions.

The method for kneading is not particularly limited, and the order of the introduction of the components can be suitably determined.

For example, there may be employed a method in which the specific fluorine-containing oligomer surfactant and other lubricating agents and additives are dissolved beforehand in an organic solvent, and this solution is added to a dispersion of ferromagnetic particles which has been prepared from a solvent, binder, ferromagnetic particles, etc.

Known additives such as a dispersing agent, an antistatic agent, and other lubricating agent can also be used in preparing the magnetic coating composition.

As examples of the dispersing agent, there may be mentioned known dispersing agents such as fatty acids having 12 to 22 carbon atoms, salts of such fatty acids, derivatives of such fatty acids obtained by substituting part or all of the fatty acid's hydrogen atoms with fluorine atoms, amides of such fatty acids, aliphatic amines, higher alcohols, polyalkyleneoxidoalkyl phosphates, alkyl phosphates, alkyl borates, sarcosinates, alkyl ether esters, trialkyl polyolefins, oxy quaternary ammonium salts, and lecithin.

In the case where a dispersing agent is used, the amount thereof is generally in the range of from 0.1 to 10 parts by weight per 100 parts by weight of the ferromagnetic particles used.

Examples of the antistatic agent include electrically conductive fine particles such as carbon black and carbon black graft polymer particles; natural surface active agents such as saponin; nonionic surface active agents such as alkylene oxide-based ones, glycerin-based ones, and glycidol-based ones; cationic surface active agents such as (higher alkyl)amines, quaternary ammonium salts, salts of heterocyclic compounds such as pyridine, and phosphonium or sulfonium compounds; anionic surface active agents containing an acidic group such as a carboxylic acid, phosphoric acid, sulfate, or phosphate; and ampholytic surface active agents such as amino acids, aminosulfonic acids, and esters of sulfuric or phosphoric acid with amino-alcohols. In the case where the above-mentioned electrically conductive fine particles are employed as an antistatic agent, the amount thereof may be, for example, in the range of from 0.1 to 10 parts by weight per 100 parts by weight of the ferromagnetic particles. Where a surface active agent is employed, it is used in an amount of from 0.12 to 10 parts by weight per 100 parts by weight of the ferromagnetic particles.

Each of the above-mentioned dispersing agents, antistatic agents, lubricating agents, and other additives should not be construed as always having just one function that the name implies. For example, a dispersing agent may act also as a lubricating agent or an antistatic agent. Therefore, effects brought about by or expected from the respective additives are, of course, not limited to the effects implied by the names of these additives. Further, in the case where an additive having plural functions is employed, it is preferable that the amount of the additive used be fixed taking all these functions into consideration.

The thus-prepared magnetic coating composition is coated on the above-described nonmagnetic support. The coating on the nonmagnetic support may be performed directly or through an intermediate layer such as an adhesive layer. The intermediate layer herein means, for example, a layer consisting of an adhesive only or a layer of a composite film consisting of a dispersion of nonmagnetic fine particles, such as carbon black, in a binder.

A binder to be used for the intermediate layer containing carbon black may be freely selected from various binders that can be used for forming the magnetic layer. Preferred carbon black is one having particle diameters of 10 to 50 nm. The preferred proportion of the binder to the carbon black is from 100:10 to 100:150 by weight. The thickness of the intermediate layer is preferably from 0.1 to 2 $\mu$m in the case of a simple adhesive layer, and from 0.5 to 4 $\mu$m in the case of a composite layer containing nonmagnetic particles.

The intermediate layer may further contain a lubricating agent which is the same as or different from that to be employed in the magnetic layer.

With respect to further details of the above-described method of dispersing the ferromagnetic particles into the binder and method of coating the magnetic coating composition on a support, reference may be made to JP-A-54-46011 and JP-A-54-21805.

The coating of the magnetic coating composition is performed in such a manner that the resulting magnetic layer has a dry thickness in the range of generally from about 0.5 to 10 $\mu$m, and preferably from 0.7 to 6.0 $\mu$m.

In the case where the magnetic recording medium to be produced will be used in the form of a tape, the magnetic layer thus coated on the nonmagnetic support is usually subjected to magnetic orientation treatment to orientate the ferromagnetic particles in the magnetic layer, and then dried. In the case of a disk-shaped recording medium, on the other hand, the magnetic layer is subjected to magnetic non-orientation treatment to remove magnetic anisotropy. If necessary, the resulting magnetic layer is then subjected to surface-smoothing treatment.

The present invention will be explained in more detail by reference to the following Examples, which should not be construed to be limiting the scope of the invention. In the Examples and Comparative Example, all parts are by weight.

EXAMPLE 1

The ingredients for each composition as specified below were kneaded by means of a ball mill for 48 hours. To each of the resulting dispersions was added 5 parts of a polyisocyanate, and each resulting mixture was kneaded for 1 hour and then filtered through a filter having an average pore diameter of 1 $\mu$m. Thus, various magnetic coating compositions were prepared. Each of the thus-obtained magnetic coating compositions was applied, with a reverse-roll coater, on a 10 $\mu$m-thick poly(ethylene terephthalate) film support at a thickness of 4.0 $\mu$m on a dry basis.

| Magnetic Coating Compositions | |
|---|---|
| Ferromagnetic particles | 100 parts |
| (Kind and crystallite size are shown in TABLE 3.) | |
| Binder 1 | |
| (Kind and amount are shown in TABLES 3 and 4.) | |
| Binder 2 | |
| (Kind and amount are shown in TABLES 3 and 4.) | |
| Abrasive agent | 5 parts |
| ($\alpha$-alumina having an average particle diameter of 0.3 $\mu$m) | |
| Fluorine-containing oligomer | 0.3 part |
| Oleic acid | 0.3 part |
| Stearic acid | 0.5 part |
| Butyl stearate | 1.0 part |
| Carbon black | 2 parts |
| (average particle diameter, 40 $\mu$m) | |
| Methyl ethyl ketone | 300 parts |

The nonmagnetic supports on which the magnetic coating compositions had been applied were subjected, before the coating compositions were dried, to magnetic orientation by means of a magnet of 3,000 gauss. After being dried, the resulting magnetic coatings on the nonmagnetic supports were supercalendered. Then, those containing iron oxide-based ferromagnetic particles were slit into ½ inch-wide tapes and those containing metal-based ferromagnetic particles were slit into 8 mm-wide tapes, thereby giving video tapes.

Signals of 7 MHz were recorded on each of the above-obtained video tapes and then reproduced, by using VTR's (National NV8200 for ½ inch samples and FUJIX-8 for 8 mm samples). With respect to both iron oxide-based video tape samples and metal-based video tape samples, relative values of reproduced output were separately determined, with the output of 4 MHz from sample No. 13 (standard tape) being taken as 0 dB for the iron oxide-based samples, and the output of 7 MHz from sample No. 15 being taken as 0 dB for the metal-based samples.

Further, signals recorded over a 1-hour length with respect to each sample were repeatedly reproduced 100 times. Output was measured thereafter and its decrease from the initial output value was determined in terms of dB for the evaluation of output decrease.

In an ambience of 23° C., 10% R.H. and also in an ambience of 23° C., 70% R.H., visual signals were recorded on each tape sample for 10 minutes, and then the tape was rewound and the recorded signals were reproduced for 10 minutes. During the reproducing, the total of the time periods when the output was low due to head clogging was measured in terms of seconds for the evaluation of head clogging.

Furthermore, while signals were being reproduced under the same conditions as above, an output decrease due to contact noises was measured in terms of dB for the evaluation of contact noise, with the output value measured at the time of no noise being taken as 0 dB.

Each of the above-obtained video tapes was brought into contact with a stainless steel pole at a winding angle of 180°, while a tension ($T_1$) of 50 g was being applied to the tape. Under these conditions, the video tape was run at a speed of 3.3 cm/second and the tension ($T_2$) required for the running was measured. From the measured value, the friction coefficient, $\mu$, of the tape was calculated using the following equation.

$$\mu = 1/\pi \ln(T_1/T_2)$$

The above friction coefficient measurement was performed at 40° C., 80% R.H.

The results obtained are summarized in Tables 3 and 4.

oligomer surfactant according to the present invention show high reproducing outputs and very slight decreases in output and have low friction coefficients.

By contrast, the tape samples not employing the fluorine-containing oligomer surfactant essential in this invention and those employing other kinds of fluorine-containing surfactants are disadvantageous in that they show low reproducing outputs and have high friction coefficients.

TABLE 3-1

| | Components | | | | | | |
|---|---|---|---|---|---|---|---|
| | Ferromagnetic particles | | Binder 1 | | Binder 2 | | Fluorine-containing oligomer |
| Sample No. | Kind | Crystallite size | Kind | Amount* | Kind | Amount* | Kind |
| 1 | Co-γ-FeOx (x = 1.4) | 300Å | A | 10 | E | 10 | No. 4 |
| 2 | Co-γ-FeOx (x = 1.4) | 300Å | A | 10 | G | 10 | No. 4 |
| 3 | Co-γ-FeOx (x = 1.4) | 300Å | C | 10 | F | 10 | No. 4 |
| 4 | Co-γ-FeOx (x = 1.4) | 300Å | D | 10 | F | 10 | No. 4 |
| 5 | Co-γ-FeOx (x = 1.4) | 300Å | A | 10 | E | 10 | No. 4 |
| 6 | Co-γ-FeOx (x = 1.4) | 400Å | A | 10 | E | 10 | No. 4 |
| 7 | Co-γ-FeOx (x = 1.4) | 500Å | A | 10 | E | 10 | No. 4 |
| 8 | metal (Fe:Zn:Ni = 94:4:2) | 300Å | A | 10 | E | 10 | No. 4 |
| 9 | Co-γ-FeOx (x = 1.4) | 300Å | A | 10 | E | 10 | No. 5 |
| 10 | Co-γ-FeOx (x = 1.4) | 300Å | A | 10 | G | 10 | No. 6 |
| 11 | Co-γ-FeOx (x = 1.4) | 300Å | A | 10 | G | 10 | No. 10 |
| 12 (comparative) | Co-γ-FeOx (x = 1.4) | 300Å | A | 10 | E | 10 | F-110** |
| 13 (comparative) | Co-γ-FeOx (x = 1.4) | 300Å | A | 10 | E | 10 | none |
| 14 (comparative) | Co-γ-FeOx (x = 1.4) | 300Å | A | 10 | E | 10 | stearyl perfluorononanoate |
| 15 (comparative) | metal | 300Å | A | 10 | E | 10 | none |

*100 parts by weight of ferromagnetic particles.
**trade name, made by Dainippon Ink and Chemicals, Inc.

The results in Table 3 show that all of the video tape samples employing the specific fluorine-containing

TABLE 3-2

| | Evaluation Results | | | | | | | | |
|---|---|---|---|---|---|---|---|---|---|
| | Contact noise (dB) | | Surface roughness of magnetic layer (μm) | Initial output (dB) | | Output decrease (dB) | μ Value | Head clogging (sec/10 min.) | |
| Sample No. | 23° C. 10% | 23° C. 70% | | metal | iron oxide | | | 23° C. 10% | 23° C. 70% |
| 1 | <1 | <1 | 0.009 | | +2 | <0.5 | 0.22 | 0 | 0 |
| 2 | <1 | <1 | 0.009 | | +2 | <0.5 | 0.23 | 0 | 0 |
| 3 | <1 | <1 | 0.009 | | +2 | <0.5 | 0.22 | 0 | 0 |
| 4 | 1 | 1 | 0.009 | | +2 | <0.5 | 0.22 | 0 | 0 |
| 5 | <1 | <1 | 0.009 | | +2 | 0.5 | 0.25 | 0 | 0 |
| 6 | <1 | <1 | 0.006 | | +1 | 0.5 | 0.24 | 0 | 0 |
| 7 | 1 | 1 | 0.004 | | +1 | 1.0 | 0.38 | 0 | 0 |
| 8 | | 1 | 0.008 | +2 | | 0 | 0.22 | 0 | 0 |
| 9 | <1 | 1 | 0.009 | | +2 | <0.5 | 0.22 | 0 | 0 |
| 10 | <1 | 1 | 0.009 | | +2 | <0.5 | 0.23 | 0 | 0 |
| 11 | <1 | 1 | 0.009 | | +2 | <0.5 | 0.24 | 0 | 0 |
| 12 (comparative) | 10 | 7 | 0.009 | | 0 | 2.5 | 0.35 | 16 | 5 |
| 13 (comparative) | 13 | 9 | 0.009 | | 0 | 2.0 | 0.38 | 22 | 10 |
| 14 (comparative) | 9 | 7 | 0.009 | | +1 | 2.0 | 0.42 | 8 | 2 |
| 15 (comparative) | 7 | 6 | 0.008 | 0 | | 2.0 | 0.35 | 20 | 10 |

TABLE 4

| Kind | Basic structure | Number-average molecular weight (× 10,000) | Weight-average molecular weight (× 10,000) | Polar group Kind | Content (× 10$^{-5}$ eq/g) | Kind | Content (× 10$^{-5}$ eq/g) | Kind | Content (× 10$^{-5}$ eq/g) |
|---|---|---|---|---|---|---|---|---|---|
| A | polyester polyurethane | 2.5 | 4 | OSO$_3$Na | 5 | | | | |
| C | polyester polyurethane | 2.5 | 4 | OPO$_3$Na | 3 | | | | |
| D | polyester polyurethane | 2.5 | 4 | COOH | 5 | | | | |
| E | poly(vinyl chloride) | (polymerization degree 300) | 5 | SO$_3$Na | 6 | epoxy group | 40 | OH | 30 |
| F | poly(vinyl chloride) | (polymerization degree 300) | 5 | none | — | | | | |
| G | poly(vinyl chloride-vinyl acetate) | (polymerization degree 400) | 6 | COOH | 10 | | | | |
| H | poly(vinyl chloride-vinyl acetate) | (polymerization degree 400) | 6 | none | — | | | | |

EXAMPLE 2

A 14 μm-thick poly(ethylene terephthalate) film support was coated on one side with each of the magnetic coating compositions which had been prepared according to the method as described blow. The resulting supports with the magnetic coating compositions were subjected to magnetic orientation by means of a cobalt magnet, and then dried by passing them through an ambience of 100° C. over a period of 1 minute. Thus, magnetic layers of 5 μm in thickness were formed from respective magnetic coating compositions.

Preparation of Magnetic Coating Compositions

| Compositions | |
|---|---|
| Ferromagnetic particles of Co-adsorbed γ-Fe$_2$O$_3$ (crystallite size, 350 Å; coercive force (Hc), 880 Oe; aspect ratio, 8) | 100 parts |
| Vinyl chloride copolymer [Binder 1] (Kind and content of the polar group are shown in TABLE 5.) | 10 parts |
| Polyurethane resin "Estane 5701" (tradename, manufactured by Goodrich Company, U.S.A.) | 10 parts |
| Fluorine-containing oligomer | shown in TABLE 5 |

| Compositions | |
|---|---|
| Carbon black (average particle diameter, 20 nm) | 1.5 parts |
| Alumina fine particles | 5 parts |
| Stearic acid | 1 part |
| Ester compound | shown in TABLE 5 |
| Methyl ethyl ketone | 200 parts |
| Cyclohexanone | 200 parts |

Preparation

The ingredients for each of the above compositions were introduced into a sand grinder together with glass beads, and mixed for 2 hours. To each of the resulting dispersions was added 5 parts of isocyanate compound "Coronate L", and then each resulting dispersion was mixed by high-speed stirring, thereby preparing magnetic coating compositions.

After magnetic layers were formed as described above, calender treatment and heat-cure treatment were performed. The thus-obtained magnetic recording media were slit into tapes having a width of ½ inch, thereby producing magnetic recording tapes.

Each of the magnetic tapes thus obtained was evaluated in the same manner as in Example 1, and the results obtained are summarized in Table 5.

TABLE 5-1

| | Components | | | | Fluorine-containing oligomer | |
|---|---|---|---|---|---|---|
| Sample No. | Ester compound Kind | Amount* | Binder 1 Polar group | Amount** | Kind | Amount* |
| 16 (comparative) | — | | SO$_3$Na | 1 × 10$^{-5}$ | No. 4 | 1.0 |
| 17 | butyl stearate | 0.1 | SO$_3$Na | 1 × 10$^{-5}$ | No. 4 | 1.0 |
| 18 | butyl stearate | 0.5 | SO$_3$Na | 1 × 10$^{-5}$ | No. 4 | 1.0 |
| 19 | butyl stearate | 1.0 | SO$_3$Na | 1 × 10$^{-5}$ | No. 4 | 1.0 |
| 20 | butyl stearate | 2.0 | SO$_3$Na | 1 × 10$^{-5}$ | No. 4 | 1.0 |
| 21 | butyl stearate | 3.0 | SO$_3$Na | 1 × 10$^{-5}$ | No. 4 | 1.0 |
| 22 (comparative) | butyl stearate | 1.0 | SO$_3$Na | 1 × 10$^{-5}$ | — | — |
| 23 | butyl stearate | 1.0 | SO$_3$Na | 1 × 10$^{-5}$ | No. 4 | 1.0 |
| 24 | butyl stearate | 1.0 | SO$_3$Na | 1 × 10$^{-5}$ | No. 4 | 3.0 |
| 25 | butyl stearate | 1.0 | SO$_3$Na | 1 × 10$^{-5}$ | No. 4 | 5.0 |

| | Evaluation Results | | | | | |
|---|---|---|---|---|---|---|
| Sample | Contact noise (dB) | Surface roughness | Initial output | Output decrease | μ | Head clogging (sec/10 min.) |

TABLE 5-1-continued

| No. | 23° C. 70% | 23° C. 10% | (μm) | (dB) | (dB) | Value | 23° C. 70% | 23° C. 10% |
|---|---|---|---|---|---|---|---|---|
| 16 (comparative) | 5 | 10 | 0.05 | +1 | <1 | 0.22 | 10 | 20 |
| 17 | 1 | 2 | 0.06 | +2 | <0.5 | 0.22 | 0 | 0 |
| 18 | 1 | 2 | 0.06 | +2 | <0.5 | 0.22 | 0 | 0 |
| 19 | 0 | 1 | 0.06 | +1 | <0.5 | 0.21 | 0 | 0 |
| 20 | 0 | 1 | 0.06 | +1 | <0.5 | 0.21 | 0 | 0 |
| 21 | 0 | 1 | 0.07 | 0 | <1 | 0.20 | 0 | 0 |
| 22 (comparative) | 5 | 10 | 0.05 | 0 | 2-3 | 0.22 | 10 | 20 |
| 23 | 1 | 2 | 0.05 | 0 | <0.5 | 0.23 | 0 | 0 |
| 24 | 1 | 1 | 0.05 | 0 | <0.5 | 0.23 | 0 | 0 |
| 25 | 1 | 2 | 0.06 | −0.5 | <0.5 | 0.24 | 0 | 0 |

*parts by weight per 100 parts by weight of ferromagnetic particles.
**equivalent per g of polymer.

TABLE 5-2

| Sample No. | Ester compound | | Binder 1 | | Fluorine-containing oligomer | |
|---|---|---|---|---|---|---|
| | Kind | Amount* | Polar group | Amount** | Kind | Amount* |
| 26 | butyl stearate | 1.0 | $SO_3Na$ | $1 \times 10^{-5}$ | No. 4 | 8.0 |
| 27 | butyl stearate | 1.0 | $SO_3Na$ | $1 \times 10^{-6}$ | No. 4 | 8.0 |
| 28 | butyl stearate | 1.0 | $SO_3Na$ | $3 \times 10^{-5}$ | No. 4 | 8.0 |
| 29 | butyl stearate | 1.0 | $SO_3Na$ | $4 \times 10^{-4}$ | No. 4 | 8.0 |
| 30 | stearyl myristate | 0.5 | $PO_3Na_2$ | $7 \times 10^{-5}$ | No. 4 | 2.0 |
| 31 | 1-ethyl-1-methyl-hexyl stearate | 0.5 | $PO_3Na_2$ | $7 \times 10^{-5}$ | No. 4 | 2.0 |
| 32 | 1-methylbutyl oleate | 0.5 | $PO_3Na_2$ | $7 \times 10^{-5}$ | No. 4 | 2.0 |
| 33 | stearyl laurate | 1.5 | COOH | $1 \times 10^{-6}$ | No. 5 | 2.0 |
| 34 | butoxyethyl stearate | 1.5 | COOH | $1 \times 10^{-6}$ | No. 5 | 2.0 |
| 35 | ester of diethylene glycol with monobutyl ether and stearic acid | 1.0 | COOH | $1 \times 10^{-5}$ | No. 11 | 0.05 |

| Sample No. | Contact noise (dB) | | Surface roughness | Initial output | Output decrease | μ Value | Head clogging (sec/10 min.) | |
|---|---|---|---|---|---|---|---|---|
| | 23° C. 70% | 23° C. 10% | (μm) | (dB) | (dB) | | 23° C. 70% | 23° C. 10% |
| 26 | 0 | 0 | 0.10 | −1 | 1 | 0.27 | 1 | 3 |
| 27 | 0 | 0 | 0.06 | 0 | <0.5 | 0.22 | 0 | 0 |
| 28 | 0 | 0 | 0.05 | 0 | <0.5 | 0.22 | 0 | 0 |
| 29 | 1 | 3 | 0.05 | 0 | <0.5 | 0.22 | 1-2 | 4 |
| 30 | 1 | 1 | 0.06 | +1 | <1 | 0.22 | 0 | 0 |
| 31 | 1 | 1 | 0.06 | +1 | <1 | 0.23 | 0 | 0 |
| 32 | 0 | 0 | 0.06 | +1 | <1 | 0.22 | 0 | 0 |
| 33 | 0 | 0 | 0.06 | +1 | <1 | 0.22 | 0 | 0 |
| 34 | 0 | 0 | 0.06 | +1 | <1 | 0.22 | 0 | 0 |
| 35 | 0 | 0 | 0.06 | +1 | <1 | 0.23 | 0 | 0 |

It has been demonstrated, as shown in Tables 3 and 5, that the magnetic recording media employing the specific fluorine-containing oligomer surfactant according to the present invention not only show excellent initial performance but also have extreme stability in performance even when they are repeatedly run under a variety of ambient conditions.

While the invention has been described in detail and with reference to specific embodiments thereof, it will be apparent to one skilled in the art that various changes and modifications can be made therein without departing from the spirit and scope thereof.

We claim:

1. A magnetic recording medium comprising a nonmagnetic support having provided thereon a magnetic layer comprising a ferromagnetic particles dispersed in a binder in an amount of from 10 to 100 parts by weight of the binder to 100 parts by weight of the ferromagnetic particles, said binder comprising a polar group-containing polymer in an amount of 5% by weight or more of the binder, said polar group-containing polymer containing a polar group in an amount of $1 \times 10^{-6}$ to $1 \times 10^{-3}$ equivalent per gram of polymer, said magnetic layer having therein or on its surface an ester compound in an amount of 0.1 to 3 parts by weight per 100 parts by weight of the ferromagnetic particles, said magnetic layer having therein in an amount of 0.01 to 8% by weight based on the amount of the ferromagnetic particles or on its surface in an amount of 2 to 50 mg/m² of the magnetic recording medium a fluorine-containing oligomer surfactant which has a side chain having a poly(alkylene oxide) structure, a side chain terminated with a perfluoroalkyl group, and a side chain derived from an ester of acrylic or methacrylic acid with an aliphatic alcohol.

2. A magnetic recording medium of claim 1, wherein said fluorine-containing oligomer surfactant contains 2 to 40%, in terms of polymerization degree (numerical percentage) of copolymerized monomer units derived from an aliphatic ester of acrylic or methacrylic acid.

3. A magnetic recording medium of claim 1, wherein said ester is represented by the following formula:

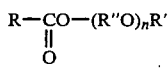

wherein R is a straight-chain or branched hydrocarbon group having 5 to 22 carbon atoms, R' is a straight-chain or branched hydrocarbon group having 1 to 8 carbon atoms, R" is a straight-chain or branched divalent hydrocarbon group having 2 to 3 carbon atoms, and n is an integer of 0 to 11.

4. A magnetic recording medium of claim 1, wherein the perfluoroalkyl group is of a straight-chain structure.

5. A magnetic recording medium of claim 1, wherein the polymerization degree of the fluorine-containing oligomer is 10 to 400 and wherein the amount of the copolymerized monomer units derived from an aliphatic ester of acrylic or methacrylic acid is 2 to 40% in terms of polymerization degree and the amount of copolymerized fluorine-containing monomer units is 10 to 90% in terms of polymerization degree.

6. A magnetic recording medium as in claim 1, wherein the amount of the polar group-containing polymer is 15 to 30% by weight of the binder.

7. A magnetic recording medium as in claim 1, wherein said fluorine-containing oligomer surfactant is represented by the formula (I):

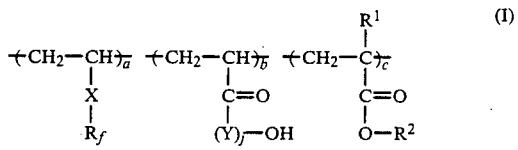

wherein $R_f$ represents a perfluoroalkyl group, X represents

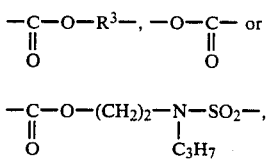

(in which $R^3$ represents a divalent hydrocarbon group having 1 to 3 carbon atoms), Y represents at least one alkenylene oxide group having 1 to 10 carbon atoms, j is an integer of from 5 to 120, $R^1$ represents a hydrogen atom or a methyl group, $R^2$ represents a hydrocarbon group, a is an integer of from 10 to 90, b is an integer of from 5 to 50, and c is an integer of from 5 to 70, provided that the total number of a, b and c is 100.

* * * * *